United States Patent [19]

Cuilleron

[11] 4,188,161
[45] Feb. 12, 1980

[54] MILLING CUTTER WITH INSET CUTTING BLADES

[76] Inventor: Jean Cuilleron, 57 rue Francisque Voytier 42100, Saint-Etienne-Loire, France

[21] Appl. No.: 880,002

[22] Filed: Feb. 21, 1978

[30] Foreign Application Priority Data

Feb. 22, 1977 [FR] France .................. 77 06006

[51] Int. Cl.² ............................................. B26D 1/12
[52] U.S. Cl. ........................................ 407/25; 407/51
[58] Field of Search ...................... 407/25, 30, 33, 44, 407/47, 49, 51, 61

[56] References Cited

U.S. PATENT DOCUMENTS

| 509,145 | 11/1893 | Thompson | 407/51 X |
| 866,372 | 9/1907 | Maltby | 407/51 X |
| 2,374,528 | 4/1945 | Emde et al. | 407/47 |
| 2,407,519 | 9/1946 | Slater | 407/51 X |
| 3,162,928 | 12/1964 | Kruse | 407/25 |

FOREIGN PATENT DOCUMENTS

972625 8/1959 Fed. Rep. of Germany.
1068148 2/1954 France.
1218173 12/1959 France.

Primary Examiner—Harrison L. Hinson
Attorney, Agent, or Firm—Haseltine, Lake & Waters

[57] ABSTRACT

A milling cutter comprising a cylindrical body having a bore adapted for receiving a driving shaft in coupled relation and a periphery with uniformly distributed trapezoidal cavities therein with inset cutting blades in the cavities. The cutting blades have base sections of trapezoidal shape corresponding to that of the cavities and the blades are insertable in two different positions, one being an endless screw position in which the periphery of the teeth of the blades are inscribed in a circle concentric with the axis of the body and the other being a spur position in which the tips of the teeth are inscribed in a circle concentric with the axis of the body. The base sections of the blades have surfaces facing respective surfaces of the cavities and respective pairs of the surfaces are formed with longitudinal grooves cooperatively defining common spaces in which axial keys are engaged to lock the respective blades in the cavities radially. Abutments are centrally positioned along the length of the body and affixed thereto for engaging in respective slots in the blades to hold the same axially on the body in both positions thereof.

11 Claims, 7 Drawing Figures

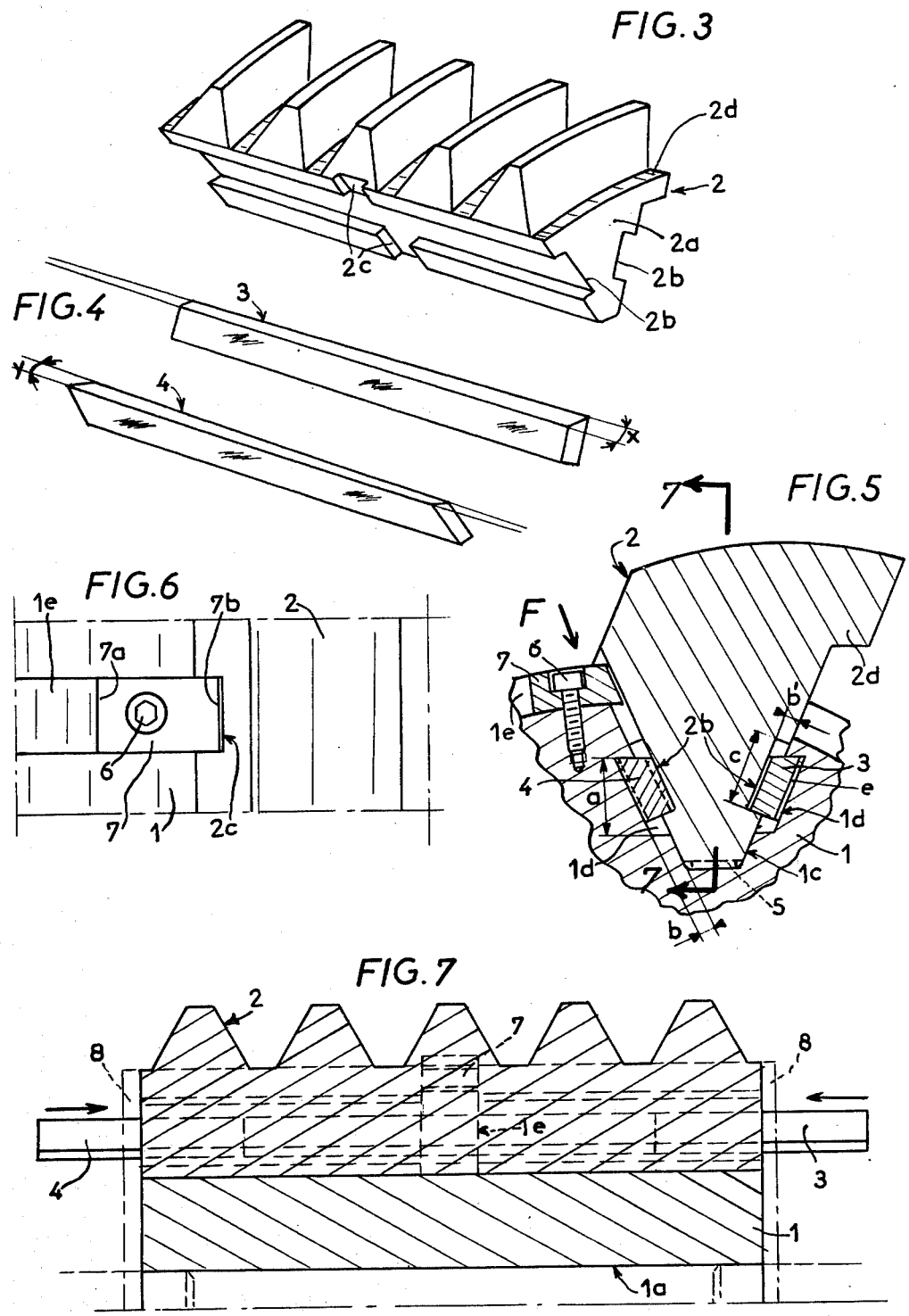

4,188,161

MILLING CUTTER WITH INSET CUTTING BLADES

FIELD OF THE INVENTION

The invention relates to a milling cutter having inset blades and particularly to tools for cutting gear teeth by generation.

BACKGROUND

Milling cutters with inset blades have gradually replaced one piece milling cutters due to their numerous advantages, notably in their lower cost due to the fact that high speed steel can be limited to the blades while the body of the milling cutter can be made of less expensive materials and the metallurgical properties of the high speed steel blades are much higher than those of the one piece milling cutters.

Another advantage of the milling cutters with inset blades, very often not utilized, is the replacement in the body of new blades.

In fact, the attachment of the blades in the body of the milling cutter is generally very complex, is difficult to be carried out and is not always very effective. In particular, blades which are threadably secured in the body at their bases are fragile and tend to rupture, whereas blades which are mounted on the body with hoops are practically non-removable due to the mounting force. The threadable mounting of the blades in the body at a plurality of locations requires a long and fastidious mounting operation and the use of a special tool which leads to deformations of the blades along their length.

Furthermore, these milling cutters are formed from a body on which the blades are fixed in an endless screw position, that is to say, for a cutting and rectification along a top circle concentric with the body and the blades are removed, turned and re-aligned in very precise manner in order to obtain a spur position either on the same body or on another body. It is appreciated that these delicate operations considerably increase the price of the milling cutters.

Additionally, the transverse attachment of the blades must be effected by means complementary to that by which the blades were affixed to the body namely, by threading or hoops. For this purpose, it is necessary to secure on each end of the body, flanges, clamps, screws and other members which considerably increase the size of the cutter and provide an active length which is much less than the overall lengths.

SUMMARY OF THE INVENTION

An object of the invention is to provide a milling cutter in which the disadvantages noted above are eliminated and in which a number of advantages are obtained provided a milling cutter utilizing the principle of inset blades mounted on a single body for grinding in endless screw position or in cutting position (by reversal) wherein the attachment of the blades on the body is simple, rapid and effective and permits frequent replacement and reversal with high reliability while substantially diminishing the price of the tool and increasing the active length of the blades with respect to the size of the milling cutter, this active length being capable of being made equal to or greater than the total length if the need exists.

According to a first feature of the invention, the inset blades are radially secured on the body by at least one key secured in grooves in the body and the blades, said grooves being formed symmetrically on the body on both sides of a median axis of radial cavities formed on the body and in which the base portions of the blades are secured.

Another feature is found in the fact that the blades are positioned axially or transversely on the body in their endless screw position and in their spur position by median abutments fixed on the body and cooperating without play with median slots formed on the blades; the abutments being dimensioned to cooperate with the blades in their two positions.

BRIEF DESCRIPTION OF DRAWINGS

These and additional features will follow from the description which follows.

FIG. 3 is a perspective view showing a cutting blade according to the invention.

FIG. 4 is a perspective view showing keys for radial attachment of the blades.

FIG. 5 is a sectional view of a portion of the milling cutter on enlarged scale showing the assembly of a cutting blade on the body.

FIG. 6 is a view of a portion of the milling cutter as seen in the direction of arrow F in FIG. 5 illustrating the transverse mounting of the cutting blades.

FIG. 7 is a partial sectional view taken along line 7—7 in FIG. 5 illustrating particularly the mounting of the keys for radial attachment of the blades in the body.

DETAILED DESCRIPTION

Figure 1:
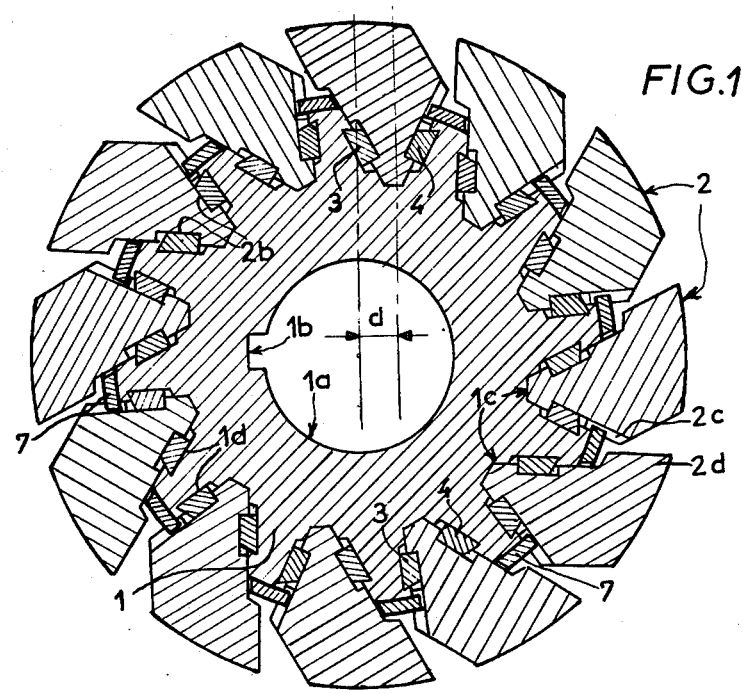
FIG. 1 is a sectional view illustrating a milling cutter according to the invention with the cutting blades in endless screw position.

In order to render the object of the invention more concrete, it will be described in non-limitative fashion in the embodiments illustrated in the figures of the drawing.

The milling cutter, according to the invention, comprises a cylindrical body 1 having a bore 1a with a keyway 1b or other means for angular drive of the body by a shaft or spindle of the machine. At the periphery of the body there are formed cavities 1c open at two sides and of generally trapezoidal shape each of whose axis of symmetry or median axis is offset with respect to the axis of the body by a distance d (FIG. 1).

In the illustrated embodiment there are twelve cavities, but it is obvious that there can be more or less according to needs or the diameter of the body.

On each lateral wall of the cavities are symmetrically formed grooves 1d also open whose bottoms are parallel to the lateral surface whereas the side walls are parallel to the bottom of the cavity 1c. These grooves have a width and a depth b (FIG. 5).

In the cavities 1c there are engaged blades or bars 2 having bases or feet 2a of a section corresponding to that of the cavities 1c. On each lateral surface of the base 2a of each blade 2 are formed grooves 2b each having a bottom parallel to the respective lateral surface and sides perpendicular to the bottom. The grooves 2b have a width c and depth $b^1$, the depth $bl$ being substantially equal to the depth b of the grooves 1d (FIG. 5).

When the blades 2 are mounted in the cavities 1c, the grooves 1d and 2b are substantially offset in height, the grooves 2b being higher than the grooves 1d (FIG. 5).

The spaces e common to the two confronting grooves 1d and 2b define trapezoidal openings of width $b+b^1$ in which are introduced keys 3 and 4 of corresponding section and of a length equal or slightly less than the width of the body. The opposite side surfaces of the keys have along their length a slight conicity shown by the angles x and y in FIG. 4 in order to be slidably introducible along a certain length until they reach a final defined position by tight locking in the spaces e.

Additionally, the keys are inserted at their smallest ends into the spaces e in opposite directions as shown in FIG. 7 which provides a locking in both directions.

It is to be noted that in a variation, the conicity can be provided on one or the other of the grooves 2b and 1d, or both, rather than on the keys. One can also provide a double conicity of the keys (in two perpendicular directions) with conicity of one of the grooves.

Additionally, it is not excluded that in order to take up clearances between the sizes of the cavities 1c and the blades 2 which would leave a space between the lower face of the blades and the bottom of the cavities, a third conical key 5 (shown in dotted lines in FIG. 5) could be engaged in this space. This latter key could also be intentionally provided to avoid all mechanical stresses in the body during the working operation.

It is not outside the scope of the invention to provide a single lateral key, in which case the blades would have two opposite grooves and the cavities 1c should have a single groove.

Figure 2:
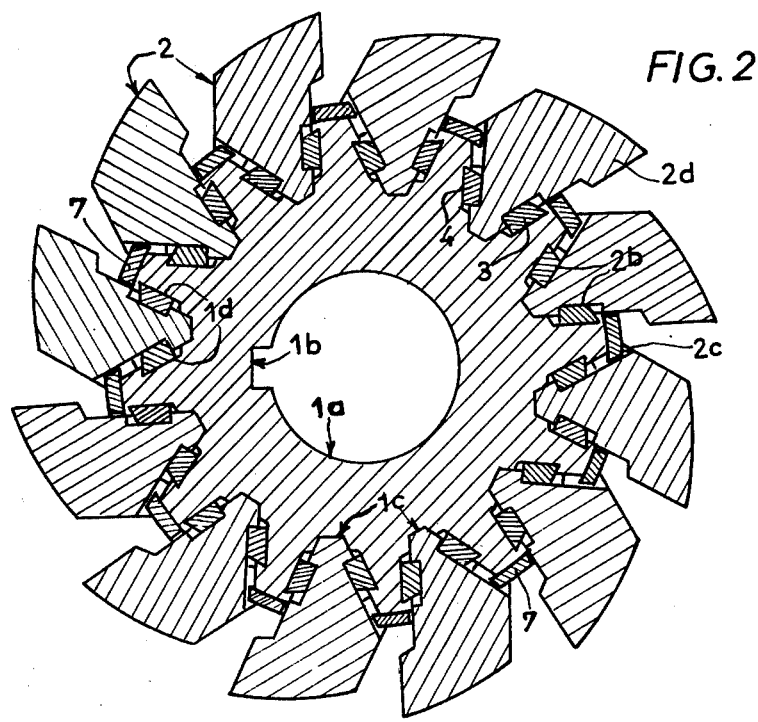
FIG. 2 is a sectional view illustrating a milling cutter according to the invention with the blades in spur position.

The blades 2 can be mounted selectively in the endless screw position (FIG. 1) or in the spur position (FIG. 2). In order to avoid all fastidious realignment and to eliminate all transverse mountings of the blades by members connected laterally on the body which would increase the length of the milling cutter without increasing its active length, there is provided precise positioning means in the middle portion of the blades.

For this, the periphery of the body has in its median portion a slot 1e in which there are fixed, by screws 6 or the like, abutment plates 7 which are dimensioned and spaced along the periphery of the body such that either their front face 7a or their rear face 7b can engage without play in a recess 2c formed in the median portion of the blades and preferably on the lateral surface opposed to the active portion 2d of the blades. This recess has about the same depth as the grooves 2b and transverses the lateral surface from one end to the other for obvious reasons for engagement of the blades in the cavities 1c.

It is understood that the positioning of the blades is obtained in very precise manner at the center of the blades and of the body, these being always aligned whether in the endless screw position or in the spur position. Furthermore, the absence of lateral members for transverse locking of the blades (clamps and screws) provides, for the same length as conventional milling cutters, blades of substantially greater active length. If necessary, a simple washer 8 (dotted outline, FIG. 7) can be secured to the sides of the body, the washer having the purpose of controlling the concentricity of the tool for its utilization on machines and for the inscription of technical and commercial markings.

The advantages follow from the description, in particular we emphasize:

the mounting of the blades on the body by keys having opposed action effects a locking on a great surface without deformation of the blades, and without possible axial sliding movement.

the mounting of the blades by conical keys facilitates the disengagement from their grooves and insures frequent and rapid replacement.

the precise positioning of the blades transversely by the axial abutments avoids any laborious realignment and permits an increase of the active length of the blades for a milling cutter of the same length with respect to the known mountings.

the blades are more reliable by reason of the mounting by the keys and their substantial shape well anchored in the body.

Also notable are the advantages obtained by the elimination of a blank due to the fact that the cavities and the grooves in the body are symmetrical.

The invention is not limited to the illustrated embodiments nor to those the particular means of realization of the various portions which have been disclosed; Rather, the invention encompasses all modification and variations as defined in the appended claims.

What is claimed is:

1. A milling cutter comprising a cylindrical body having a bore adapted for receiving a driving shaft in coupled relation, said body having a periphery with uniformly distributed trapezoidal cavities therein, cutting blades with teeth thereon and base sections of trapezoidal shape corresponding to said cavities and insertable therein in two different positions, one being an endless screw position in which the periphery of said teeth of blades are inscribed in a circle concentric with the axis of the body and the other being a spur position in which the tips of the teeth are inscribed in a circle concentric with the axis of the body, said base sections of trapezoidal shape of the blades having inclined, radial surfaces facing respective inclined side surfaces of the trapezoidally shaped cavities in said body, at least one of said pair of surfaces being provided with longitudinal groove means, an axial key engaged in said groove means to lock the respective blade in the cavity radially in either of said positions, and means on said body for engaging the blades at an intermediate location along the axial length thereof for securing the blades axially in both of said positions thereof.

2. A milling cutter as claimed in claim 1 wherein the means for axially securing the blades comprises abutments secured to said body in equally spaced relation along the periphery thereof, said base section of each blade having a slot in one of the opposite surfaces thereof, each abutment engaging in the slot of one blade in one of the inserted positions of the blades and in the slot of an adjoining blade in the other of the inserted positions of the blades.

3. A milling cutter as claimed in claim 2 wherein said abutments are disposed at a location midway along the length of the body.

4. A milling cutter as claimed in claim 3 wherein in one position the surface of the base section with the slot faces forwardly with respect to the direction of rotation of the body whereas in the other position, the surface of the base section with the slot faces rearwardly with respect to the direction of rotation of the body, said abutments respectively engaging the slots in the forwardly and rearwardly facing surfaces in the two positions of the blades.

5. A milling cutter as claimed in claim 4 wherein said body is provided with a recess at said location midway along the length thereof, said abutments being secured in said recess.

6. A milling cutter as claimed in claim 1 wherein said longitudinal groove means is constituted by grooves in said radial surfaces of the base sections of the blade and opposed grooves in the side surfaces in the cavities in the body.

7. A milling cutter as claimed in claim 6 wherein said grooves in the side surfaces of the trapezoidal cavities are symmetrical and axial, each having a bottom extending parallel to the respective surface of the cavity and side walls parallel to the bottom of the cavity.

8. A milling cutter as claimed in claim 7 wherein said grooves in the radial surfaces of the base sections of the blades are symmetrical and axial, each having a bottom parallel to the respective surface and side walls perpendicular to said bottom, the grooves in the blades being slightly wider than the grooves in the surfaces of the cavities and cooperatively defining therebetween common spaces.

9. A milling cutter as claimed in claim 8 wherein said axial key has a trapezoidal section insertable into said common space, one of said sections having slight conicity in an axial direction, said key being initially positioned slidably in the common space and then, by forced entry therein, being locked in final position due to said slight conicity.

10. A milling cutter as claimed in claim 9 wherein the axial key has a trapezoidal section with slight conicity, the longitudinal surfaces of the trapezoidal section of the key being slightly inclined axially to form said slight conicity, said keys being engageable in said common spaces in opposite directions in opposition to locking forces.

11. A milling cutter as claimed in claim 10 comprising a further axial key of conical section engageable, initially slidably and then with locking fit, between the lower surface of the base section of each blade and the bottom of the associated cavity in the body.

* * * * *